US008472053B2

(12) United States Patent  
Aoki

(10) Patent No.: US 8,472,053 B2  
(45) Date of Patent: Jun. 25, 2013

(54) ELECTRONIC DEVICE INCLUDING SELECTIVE TRANSMISSION, AND IMAGE FORMING DEVICE AND SYSTEM

(75) Inventor: Takashi Aoki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 808 days.

(21) Appl. No.: 12/616,540

(22) Filed: Nov. 11, 2009

(65) Prior Publication Data

US 2010/0315668 A1    Dec. 16, 2010

(30) Foreign Application Priority Data

Jun. 11, 2009   (JP) ................................. 2009-140163

(51) Int. Cl.
*G06F 3/12* (2006.01)

(52) U.S. Cl.
USPC ............. 358/1.15; 358/1.12; 399/11; 399/21; 399/81; 399/158

(58) Field of Classification Search
USPC .................. 358/1.15, 1.12; 399/9, 19, 21, 83, 399/121, 901, 903, 11, 81, 158, 18
See application file for complete search history.

(56) References Cited

U.S. PATENT DOCUMENTS

| 6,091,915 | A  | * | 7/2000  | Takagishi ........................ 399/21 |
| 2007/0182985 | A1 | * | 8/2007  | Ciriza et al. ................. 358/1.15 |
| 2008/0316531 | A1 | * | 12/2008 | Suzuki et al. ................. 358/1.15 |
| 2008/0317267 | A1 | * | 12/2008 | Lee ................................ 381/300 |
| 2009/0141298 | A1 | * | 6/2009  | Kushida ....................... 358/1.12 |
| 2010/0046026 | A1 | * | 2/2010  | Heo ............................ 358/1.15 |

FOREIGN PATENT DOCUMENTS

| JP | 09-134049 A    | 5/1997 |
| JP | 2001-016201 A  | 1/2001 |

OTHER PUBLICATIONS

English Machine Translation of JP 2001-016201-A (Nakano, Published Jan. 19, 2001).*

* cited by examiner

*Primary Examiner* — Benny Q Tieu
*Assistant Examiner* — Juan M Guillermety
(74) *Attorney, Agent, or Firm* — Sughrue Mion, PLLC

(57) ABSTRACT

An electronic device includes a display unit that displays operation information about a user's operation procedure; a communication unit that performs communication with a mobile terminal device; and a transmission unit that transmits, in case that a predetermined operation information is to be displayed on the display unit, image data for displaying the predetermined operation information to the mobile terminal device via the communication unit.

15 Claims, 12 Drawing Sheets

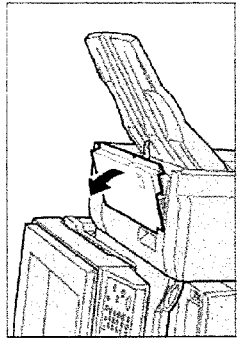
FIG.12C
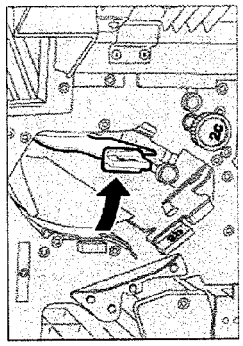
FIG.12B
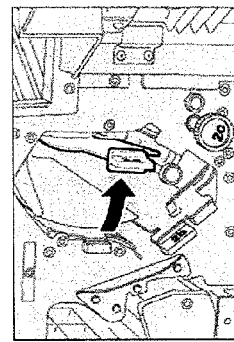
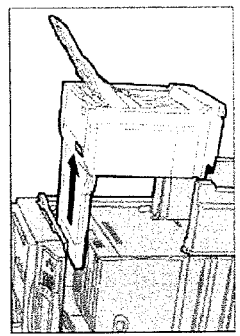
FIG.12A
OPERATION PANEL 30 OF IMAGE FORMING DEVICE 10
DISPLAY SCREEN OF MOBILE TERMINAL DEVICE 20
TRANSMISSION OF IMAGE DATA OF OPERATION INFORMATION
END OF OPERATION

ELECTRONIC DEVICE INCLUDING SELECTIVE TRANSMISSION, AND IMAGE FORMING DEVICE AND SYSTEM

CROSS-REFERENCE TO RELATED APPLICATIONS

This application is based on and claims priority under 35 USC 119 from Japanese Patent Application No. 2009-140163 filed Jun. 11, 2009.

BACKGROUND

Technical Field

The present invention relates to an electronic device, and an image forming device and system.

SUMMARY

According to an aspect of the invention, there is provided an electronic device that includes: a display unit that displays operation information about a user's operation procedure; a communication unit that performs communication with a mobile terminal device; and a transmission unit that transmits, incase that a predetermined operation information is to be displayed on the display unit, image data for displaying the predetermined operation information to the mobile terminal device via the communication unit.

BRIEF DESCRIPTION OF THE DRAWINGS

Exemplary embodiments of the present invention will be described in detail based on the following figures, wherein:

FIGS. 12A to 12C are diagrams showing an exemplary display when an operation information control section of the image forming device forwards, to the mobile terminal device, only image data for display of operation information that is about any operation difficult for a user to execute if the user keeps looking at a display section, respectively.

DETAILED DESCRIPTION

Figure 1:
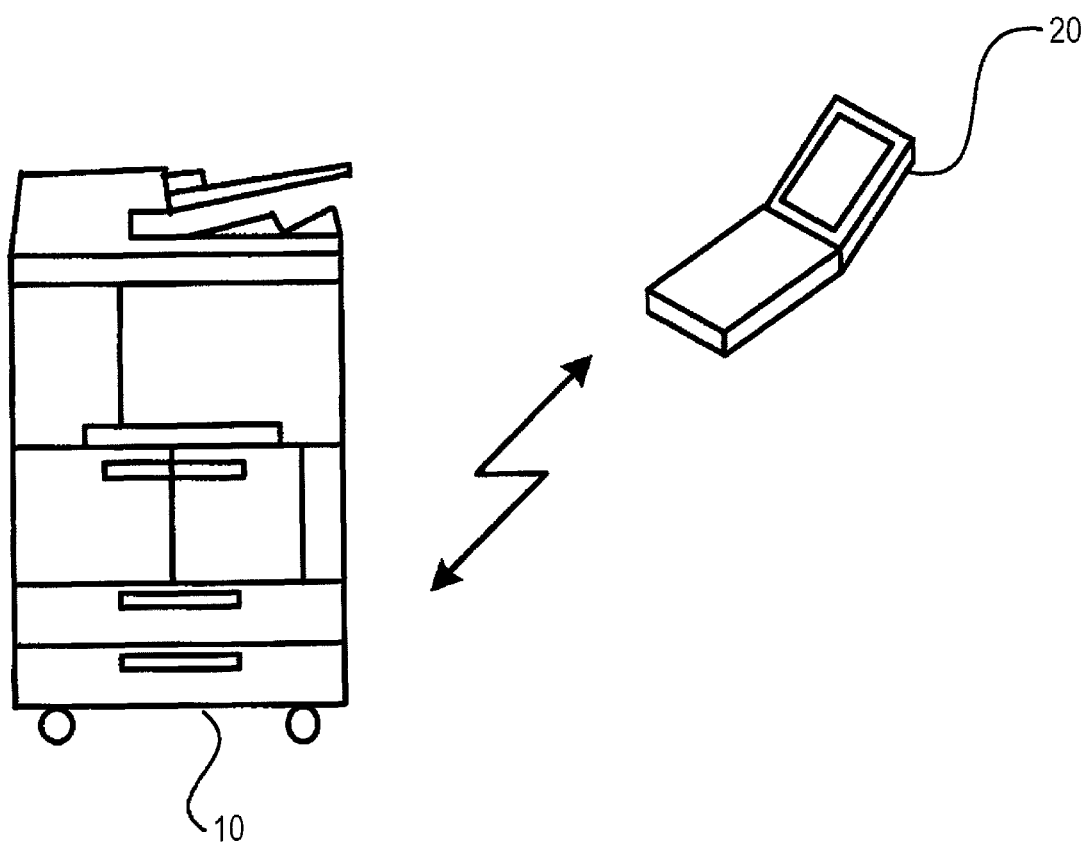
FIG. 1 is a diagram showing the configuration of an image forming system in an exemplary embodiment of the invention.

Next, an exemplary embodiment of the invention is described in detail by referring to the accompanying drawings. FIG. 1 is a diagram showing the configuration of an image forming system in the exemplary embodiment of the invention.

As shown in FIG. 1, the image forming system in this exemplary embodiment is configured to include an image forming device 10, and at least one mobile terminal device 20. Note that FIG. 1 shows only one mobile terminal device 20, but the mobile terminal device may be provided plurally in the image forming system.

The image forming device 10 in this exemplary embodiment is a so-called multi-function device having a plurality of functions to print, scan, copy, and fax, for example. The mobile terminal device 20 can be a small-sized mobile terminal device of various types as long as it has a function of being able to display image information, e.g., mobile phone, notebook personal computer, and mobile information terminal so-called PDA (Personal Digital Assistant).

Figure 2:
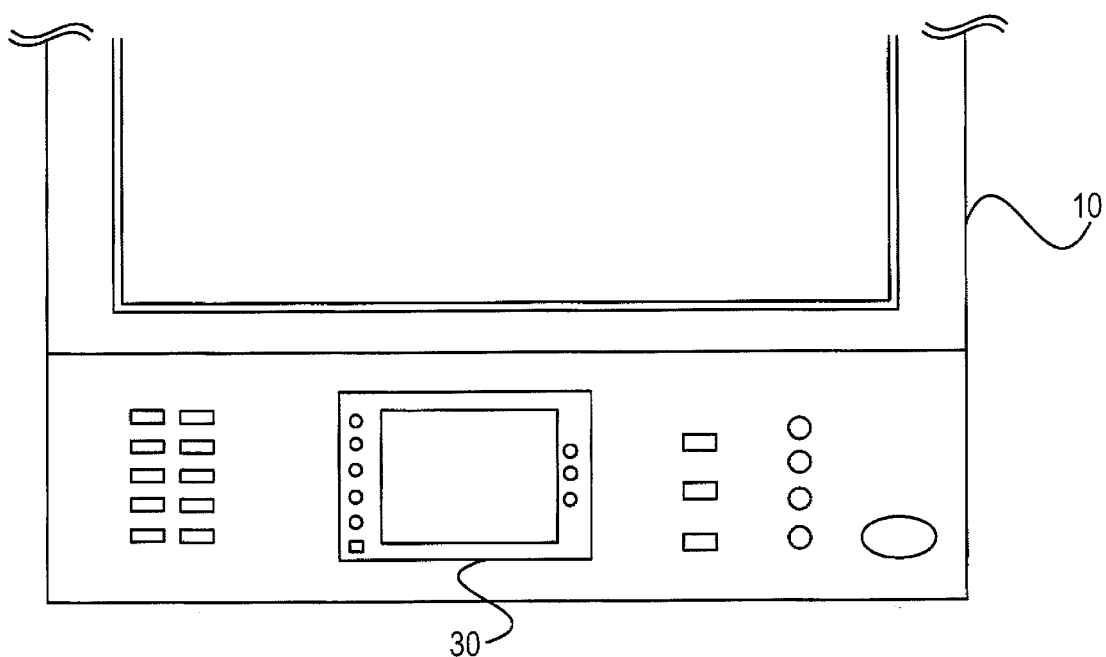
FIG. 2 is an enlarged view of an image forming device in the exemplary embodiment of the invention, specifically the operation portion thereof.

FIG. 2 shows an enlarged view of the image forming device 10 in the exemplary embodiment, specifically the operation portion thereof. The image forming device 10 is provided with an operation panel 30 on the upper surface. This operation panel 30 is provided with a display function of displaying operation information for use to ask a user to execute various operations, and a function of accepting a user's operation through a touch sensor or various types of buttons provided thereto.

Figure 3:
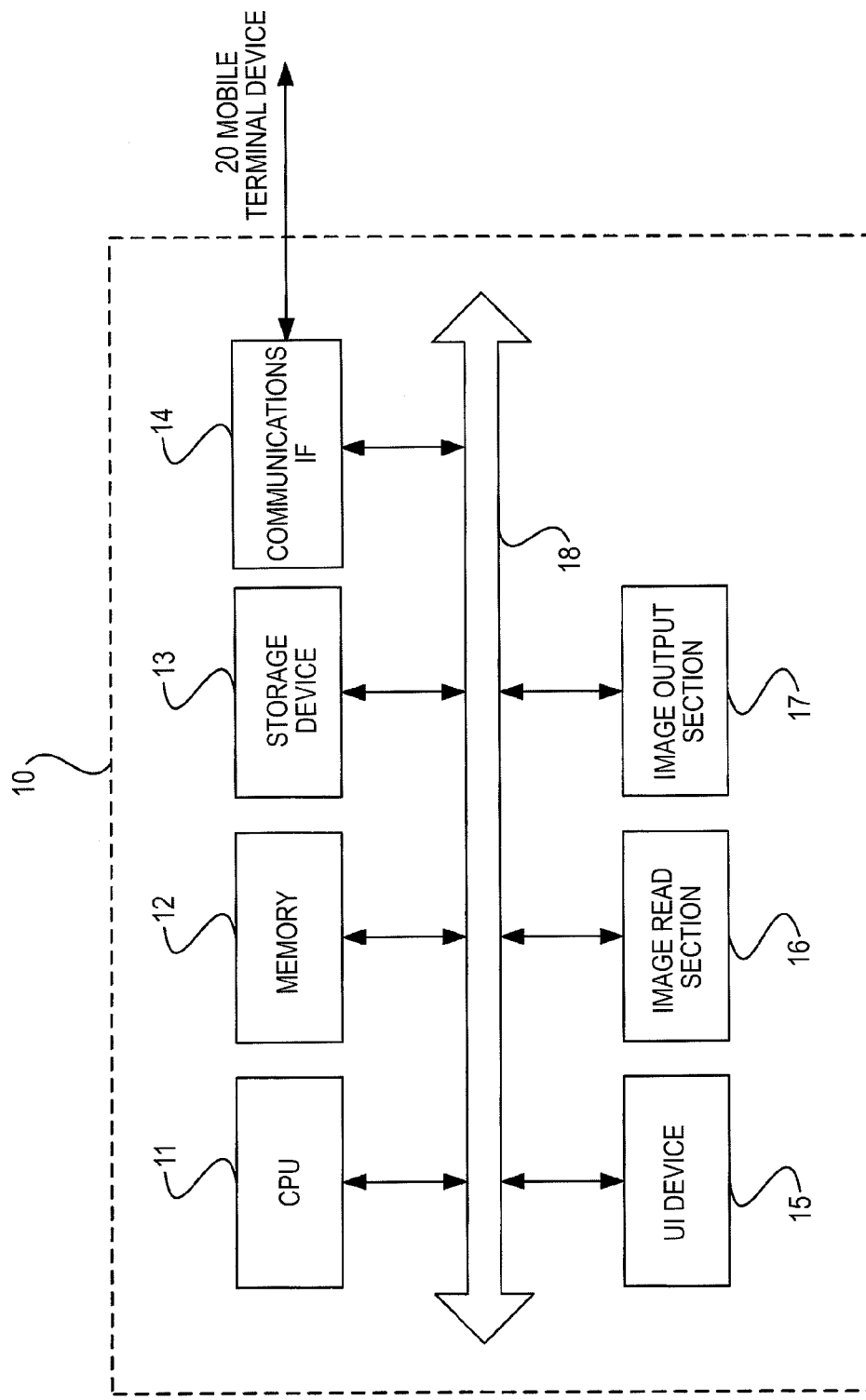
FIG. 3 is a block diagram showing the hardware configuration of the image forming device in the exemplary embodiment of the invention.

FIG. 3 shows the hardware configuration of the image forming device 10 in the image forming system of this exemplary embodiment.

As shown in FIG. 2, the image forming device 10 is configured to include a CPU (Central Processing Unit) 11, a memory 12, a storage device 13 such as hard disk drive (HDD), a communications interface (IF) 14, a user interface (UI) device 15, an image read section 16, and an image output section 17. The communications IF 14 is in charge of transmission and reception of data to/from the mobile terminal device 20 located outside. The UI device 15 includes a touch panel, or a liquid crystal display and a keyboard. These configuration components are connected to one another over a control bus 18. The UI device 15 includes the operation panel 30, and the various types of buttons shown in FIG. 2.

The image output section 17 outputs an image based on any provided command for printing. The CPU 11 executes a predetermined process based on a control program stored in the memory 12 or the storage device 13, thereby controlling the operation of the image forming device 10.

Note that, in this exemplary embodiment, the CPU 11 is exemplified as reading a control program stored in the memory 12 or the storage device 13 for execution. Alternatively, the program may be stored in a storage medium such as CD-ROM (Compact-Disk Read-Only Memory) for provision to the CPU 11.

Figure 4:
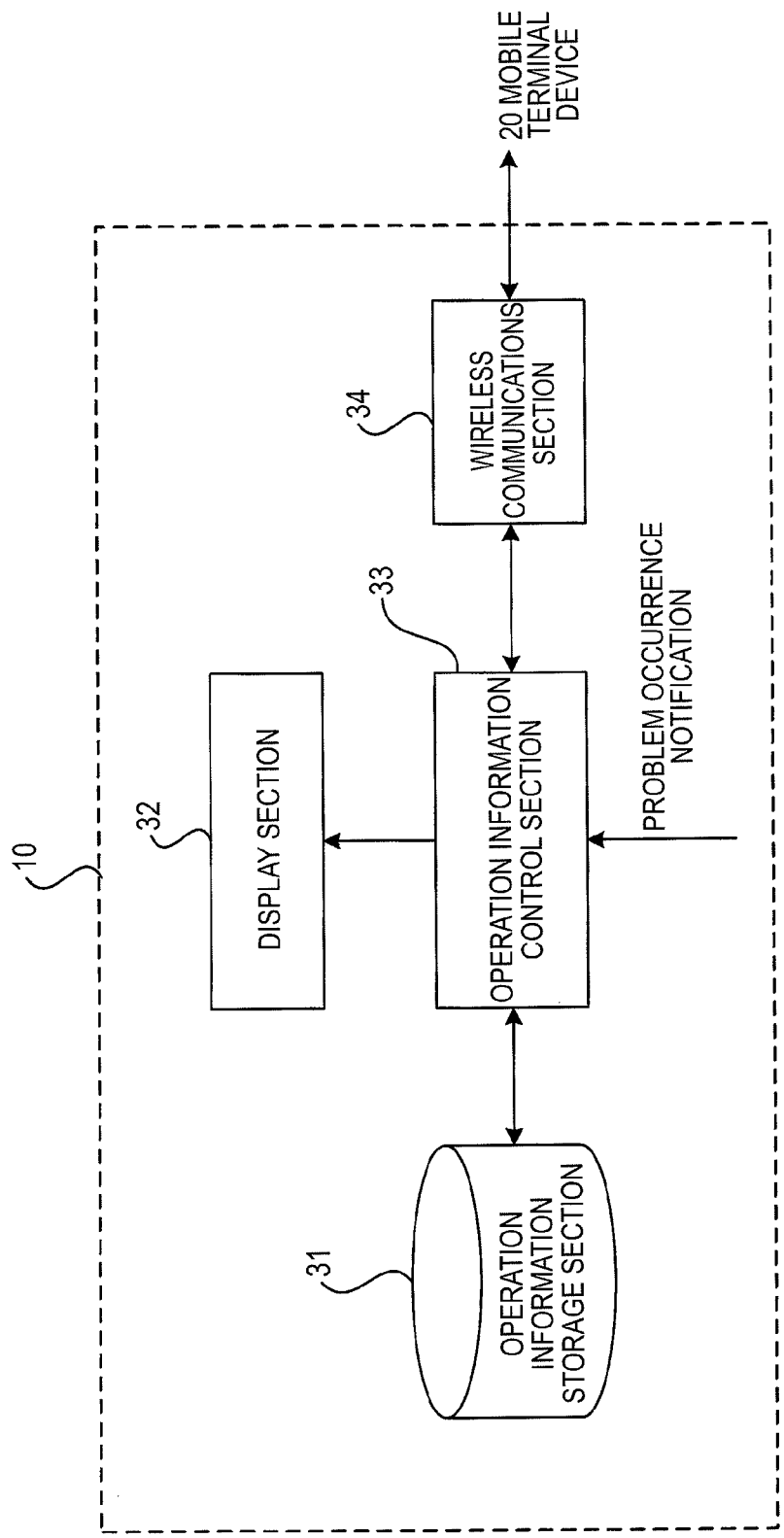
FIG. 4 is a block diagram showing the functional configuration of the image forming device in the exemplary embodiment of the invention.

FIG. 4 is a block diagram showing the functional configuration of a part of the image forming device 10 to be implemented by the CPU 11 running the control program as above. By referring to FIG. 4, no description is made of the functional configuration related to an image forming process, but only the functional configuration about related to display of operation information.

As shown in FIG. 4, the image forming device 10 of this exemplary embodiment is configured to include an operation information storage section 31, a display section 32, an operation information control section 33, and a wireless communications section 34.

The operation information storage section 31 stores therein operation information about a user's operation procedure to deal in details with any problem occurred in the image output section, e.g., paper jamming. The display section 32 has a function of displaying such operation information to guide the user what to do to solve the problem. Herein, this function of the display section 32 is the one corresponding to the display function of the operation panel 30 of FIG. 2.

The wireless communications section 34 has a function of performing communications with the mobile terminal device 20 over a radio channel such as wireless LAN (Local Area Network). Note that, in this exemplary embodiment, exemplified is the case that data transmission and reception is performed over a radio channel between the image forming device 10 and the mobile terminal device 20, but alternatively, the image forming device 10 and the mobile terminal device 20 may be connected together over a cable line. If this is the configuration, the user connects a mobile terminal device for display of operation information thereon with the image forming device 10 using a cable or others.

The operation information control section 33 then determines whether or not the operation information includes any operation difficult for the user to execute if the user keeps looking at the display section 32. The operation information here is the one about the user's operation procedure to solve any problem occurred in the image forming device 10. For example, if with the image forming device 10 provided with the operation panel 30 serving as a display section, an operation to clear paper jamming or others occurred on a tray or others provided on the upper surface of the device is determined as being executable by the user even if the user keeps looking at the display section 32. On the other hand, an operation involving any mechanism inside of the image forming device 10 is determined as being difficult for the user to execute if the user keeps looking at the display section 32, i.e., any mechanism that is located on the rear side in the image forming device 10, and appears when the front cover thereof is opened.

Figure 5:
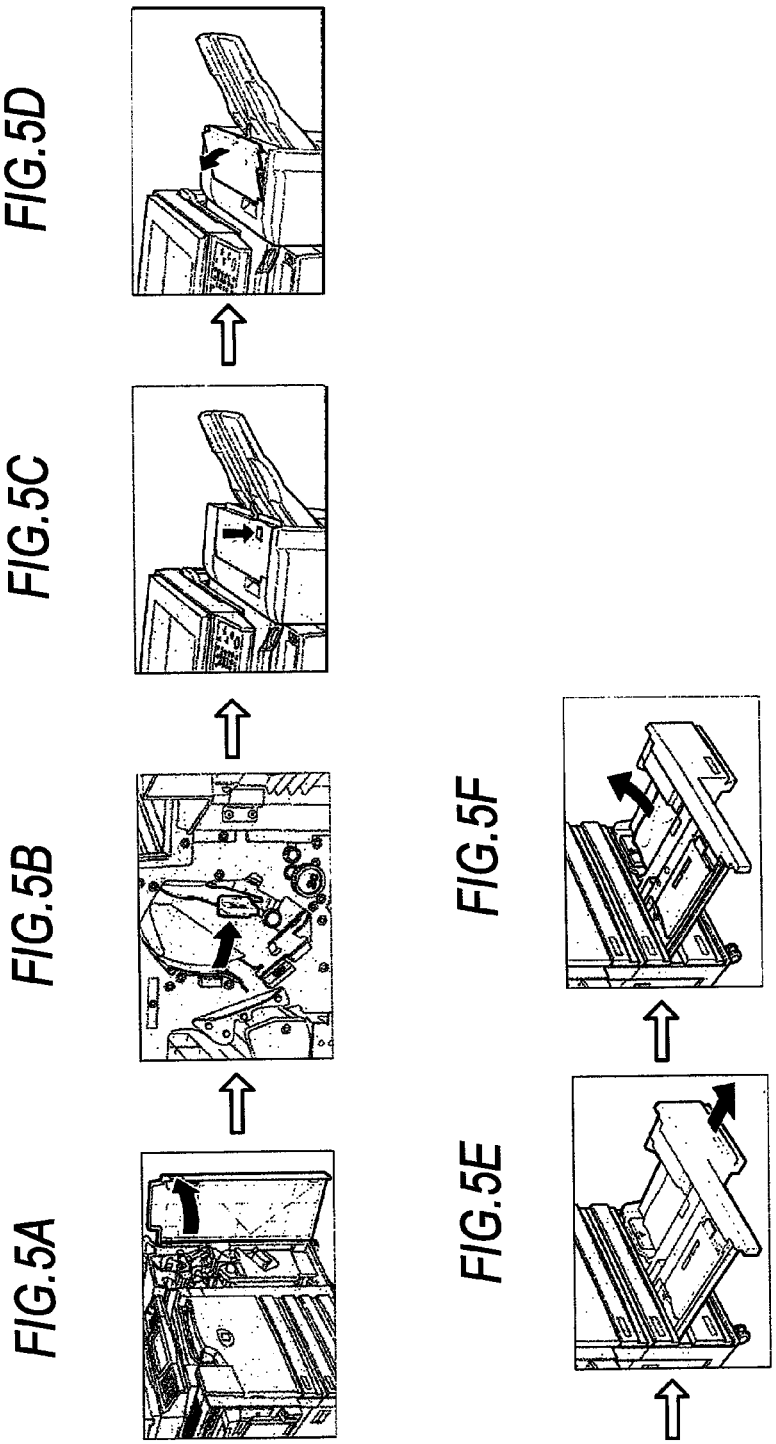
FIGS. 5A to 5F are diagrams showing exemplary operation information for use to solve any occurred problem, respectively.

As a specific example, to solve any occurred problem, described here is a case of requiring a plurality of operation steps in FIGS. 5A to 5F. Among the operation steps in FIGS. 5A to 5F, the operation steps in FIGS. 5C and 5D are those involving a mechanism located in the upper portion of the image forming device 10, and thus are considered executable by a user even if the user keeps looking at the operation panel 30 (display section 32). The remaining operation steps in FIGS. 5A, 5B, 5E, and 5F are those involving a mechanism located inside of the image forming device 10 or a mechanism such as lower tray, and thus are considered difficult for the user to execute if the user keeps looking at the operation panel 30 (display section 32).

When the operation information control section 33 determines that the operation information includes any operation difficult for the user to execute if the user keeps looking at the display section 32, image data for display use of the operation information is forwarded thereby to the mobile terminal device 20 via the wireless communications section 34.

To be ready for when the capacity of a storage medium available for use in the mobile terminal device 20 being a destination of the operation information is not enough to store the image data to be provided by the wireless communications section 34, the operation information control section 33 is also provided with a function of dividing the image data into a plurality of image data pieces. When the image data for display use of the operation information is divided into a plurality of image pieces as such, the operation information control section 33 sequentially forwards the division results, i.e., a plurality of image data pieces, to the mobile terminal device 20. Herein, the expression of "dividing the image data into a plurality of image data pieces" does not mean to divide a piece of image into a plurality of image pieces, but to divide image data being a cluster of display data of a plurality of images on a basis of such display data. Herein, the images are those each showing an operation step. That is, when the six operation steps in FIGS. 5A to 5F are required for solving any occurred problem, an image of operation information needed for displaying these six operation steps is accordingly divided into image pieces of operation information for display use of the operation steps in FIGS. 5A to 5F.

The operation information control section 33 is also provided with, when any problem occurred, a function of making a search of the mobile terminal device 20 located in the vicinity around the image forming device 10 via the wireless communications section 34.

The operation information control section 33 is not surely restricted to transmit every image data needed for the display of the operation information to the mobile terminal device 20. Alternatively, to the mobile terminal device 20, the operation information control section 33 may transmit only any image data corresponding to a predetermined image(s), i.e., only any image data for the display of operation information including any operation difficult for the user to execute if the user keeps looking at the display section 34.

The operation of the image forming system in this exemplary embodiment is described in detail by referring to the accompanying drawings.

Figure 6:
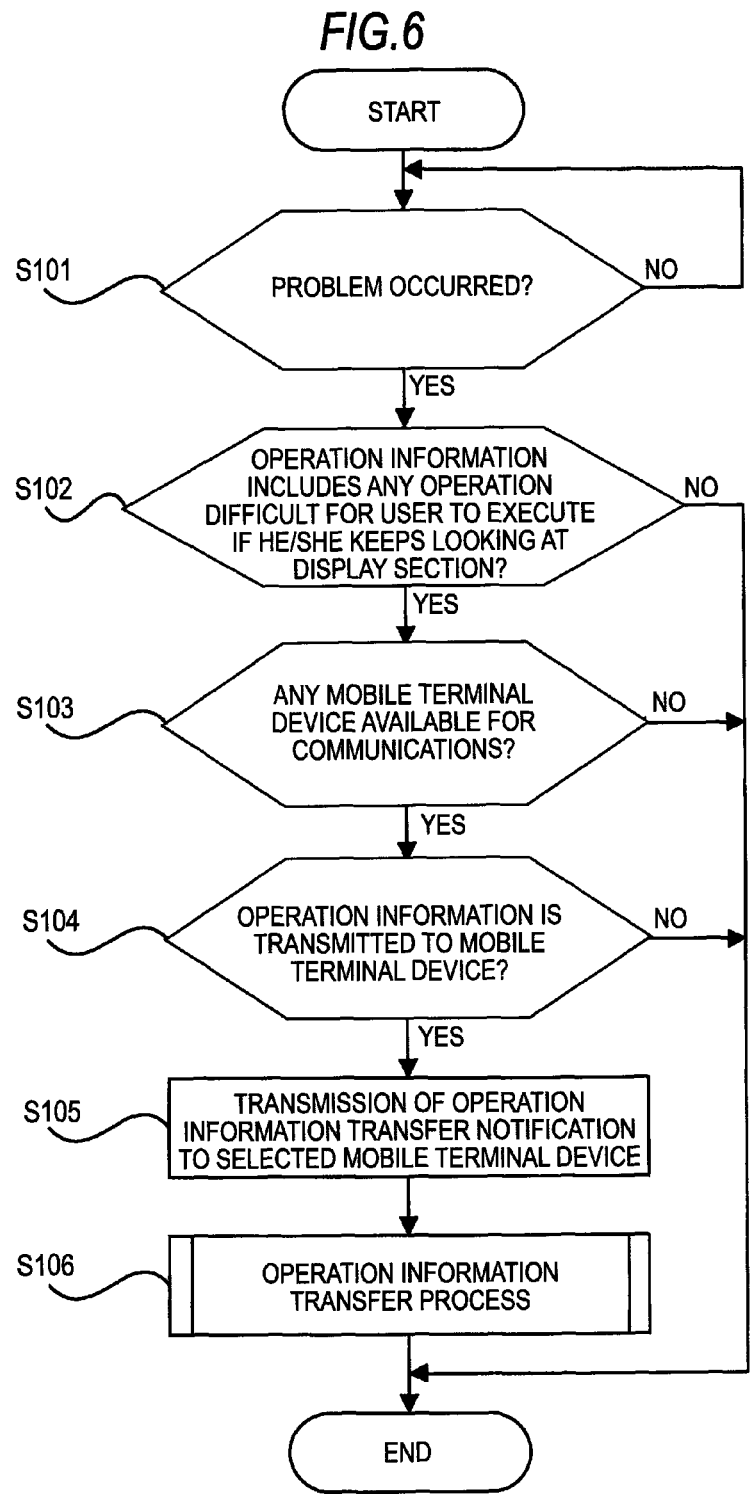
FIG. 6 is a flowchart of the entire operation of an image forming system in the exemplary embodiment of the invention.

First of all, the entire operation of the image forming system in the exemplary embodiment is described by referring to the flowchart of FIG. 6.

In the image forming device 10, when any problem such as paper jamming is detected (step S101), the operation information control section 33 determines whether or not operation information asking for a user to execute to solve the problem is about any operation difficult to be executed if the user keeps looking at the display section 32 (step S102).

When determining that the operation information includes such an operation difficult for the user to execute if the user keeps looking at the display section 32 (step S102: Yes), the operation information control section 33 searches the area around the image forming device 10 to see whether or not there is any mobile terminal device 20 available for communications therewith (step S103). When there is such a mobile terminal device 20 around the image forming device 10 available for communications therewith (step S103: Yes), the operation information control section 33 makes an inquiry to the user about whether or not to forward the operation information to the mobile terminal device 20 (step S104). In response to this inquiry in step S104, when the user issues a command for transferring the operation information to the mobile terminal 20, the operation information control section 33 accordingly forwards an operation information transfer notification to the selected mobile terminal device 20 via the wireless communications section 34 (step S105). The operation information transfer notification is for notifying the transfer of the operation information to the mobile terminal device 20.

Thereafter, an operation information transfer process is executed between the image forming device 10 and the mobile terminal device 20, and as a result, the operation information about the operation of solving the problem is displayed on the display screen of the mobile terminal device 20 (step S106).

Next, this operation information transfer process in step S106 is described in detail.

Figure 7:
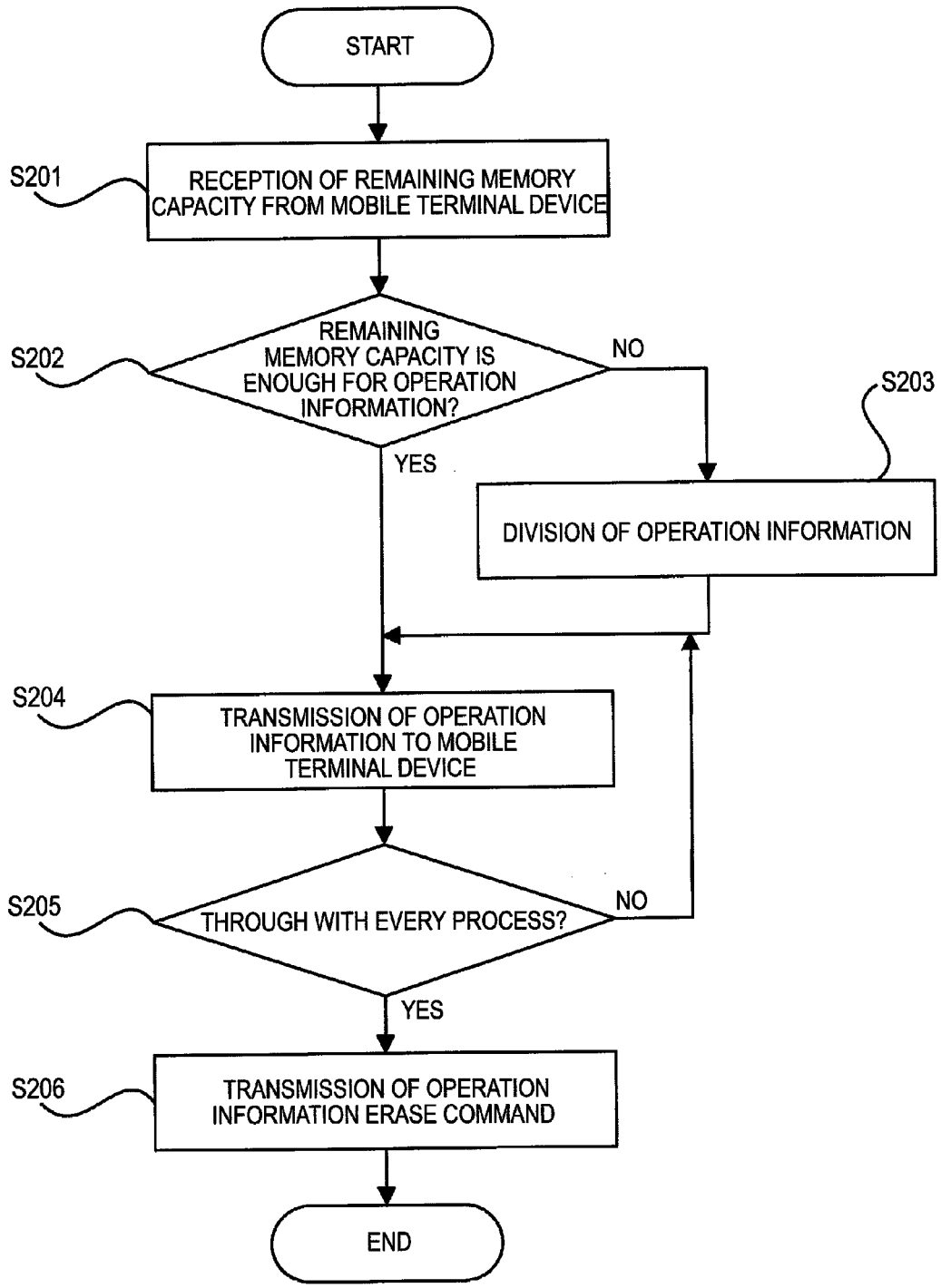
FIG. 7 is a flowchart of the operation of the image forming device during an operation information transfer process of FIG. 6.

FIG. 7 shows the flowchart of the operation of the image forming device 10 during the operation information transfer process.

After forwarding the operation information transfer notification, the operation information control section 33 of the image forming device 10 is provided with information about the remaining memory capacity from the mobile terminal device (step S201). In response thereto, the operation information control section 33 determines whether or not the remaining memory capacity is enough for storing the operation information to be transmitted (step S202). When the remaining memory capacity is enough for storing the operation information to be transmitted (step S202: Yes), the operation information control section 33 forwards the operation information before transmission all at once to the mobile terminal device 20 (step S204).

In step S202, when the remaining memory capacity is not enough for storing the operation information to be transmitted (step S202: No), the operation information control section 33 divides the operation information before transmission (step S203), and transmits the resulting operation information pieces sequentially to the mobile terminal device 20 (step S204).

The operation information control section 33 then executes a transmission process to the operation information until the process for solving the problem is completely through (step S205). When the process is completely through (step S205: Yes), the operation information control section 33 forwards an operation information erase notification to the mobile terminal device 20, and ends the process (step S206).

Figure 8:
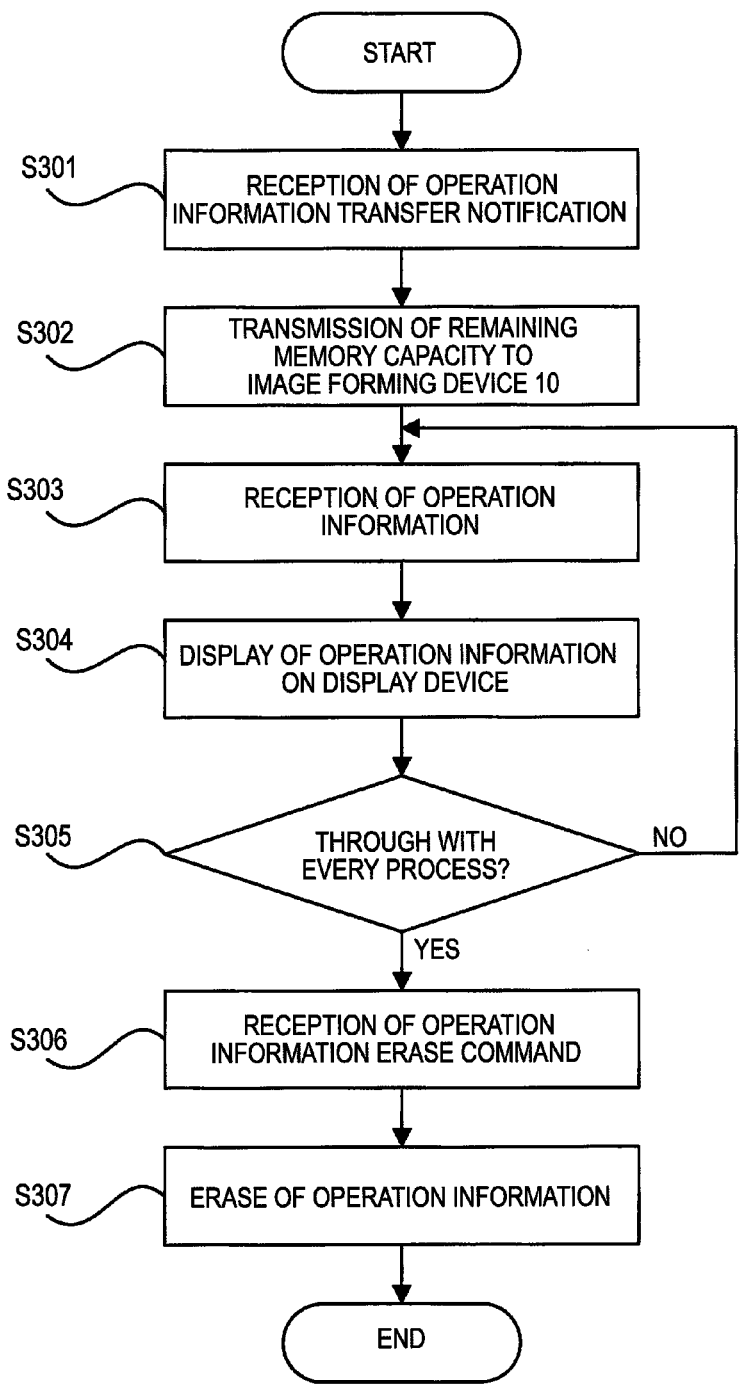
FIG. 8 is a flowchart of the operation of a mobile terminal device during the operation information transfer process of FIG. 6.

FIG. 8 shows the flowchart of the operation of the mobile terminal device 20 during the operation information transfer process.

After receiving an operation information transfer notification from the image forming device 10 (step S301), the mobile terminal device 20 forwards information about the remaining memory capacity, i.e., the storage capacity available for use, to the image forming device 10 being the source of the operation information transfer notification (step S302).

After receiving the operation information from the image forming device 10 (step S303), the mobile terminal device 20 displays the provided operation information on the display device (step S304).

Thereafter, until the process for solving the problem is completely through, the mobile terminal device 20 keeps displaying the operation information (step S305). When the process is completely through (step S305: Yes), after receiving an operation information erase command from the image forming device 10 (step S306), the mobile terminal device 20 accordingly erases the operation information on display, and ends the process (step S307).

Figure 9:
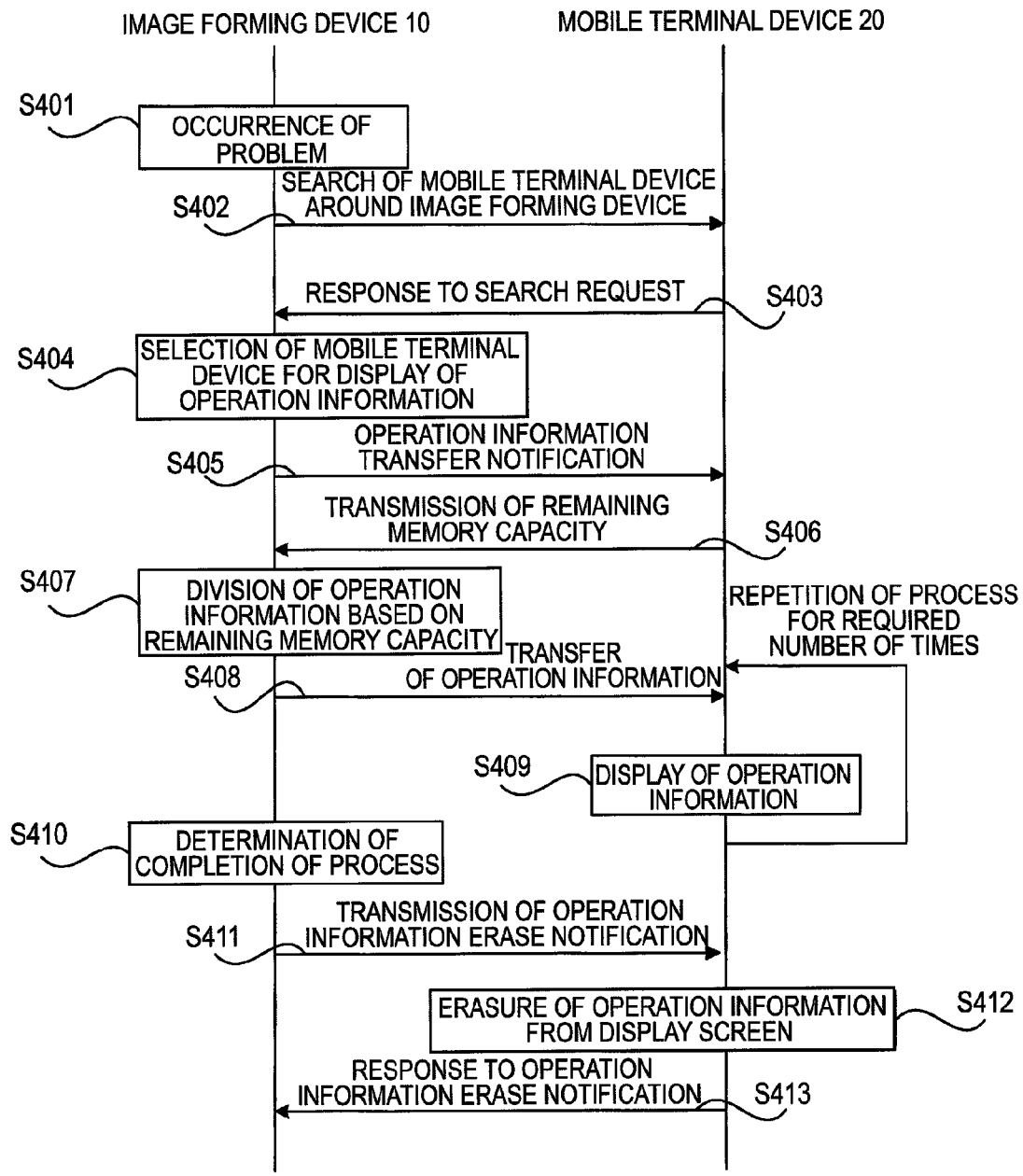
FIG. 9 is a sequence chart for illustrating the process details to be exchanged between the image forming device and the mobile terminal device.

By referring to the sequence chart of FIG. 9, described next are the process details to be exchanged between the image forming device 10 and the mobile terminal device 20.

First of all, when some problem occurs in the image forming device 10 (step S401), the image forming device 10 forwards information to the mobile terminal devices 20 in the vicinity therearound to find which mobile terminal device 20 is located in the vicinity therearound (step S402). Upon reception of such information, the mobile terminal devices 20 each forward a response to such a search request, i.e., a search result including information about its own ID number and others, to the image forming device 10 (step S403).

Figure 10:
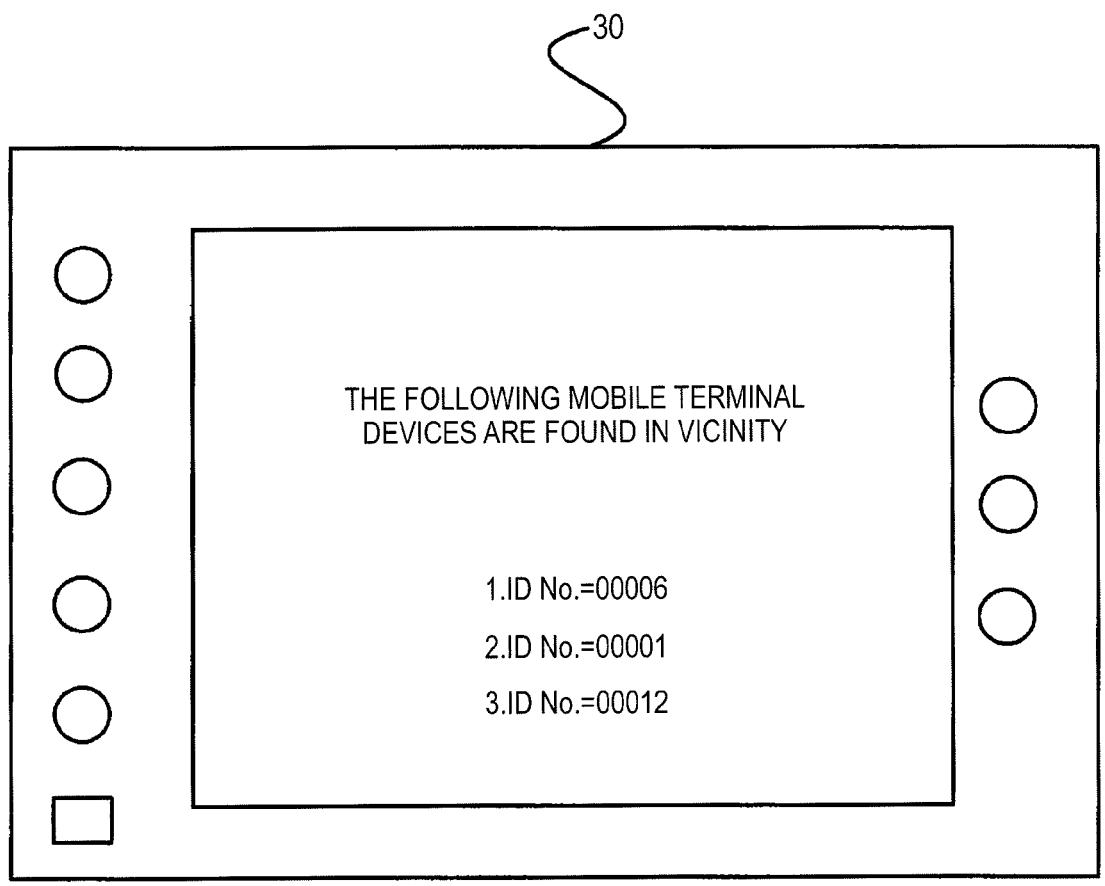
FIG. 10 is a diagram showing exemplary information displayed on an operation panel of the image forming device about which mobile terminal device is available for a connection.

When the image forming device 10 is provided with the search result from a plurality of mobile terminal devices 20, the image forming device 10 displays information about any of the mobile terminal devices 20 available for a connection therewith on the operation panel as shown in FIG. 10. When the user selects, on the display, any of the mobile terminal devices 20 for display of the operation information (step S404), the image forming device 10 forwards an operation information transfer notification to the selected mobile terminal device 20 (step S405). The mobile terminal device 20 provided with the operation information transfer notification from the image forming device 10 as such then forwards information about the remaining memory capacity back to the image forming device 10 (step S406).

After receiving the information about the remaining memory capacity from the mobile terminal device 20, based on the remaining memory capacity, the image forming device 10 determines whether or not to divide the operation information (step S407). Based on the determination result, the image forming device 10 transfers the operation information to the mobile terminal device 20 (step S408).

Figure 11:
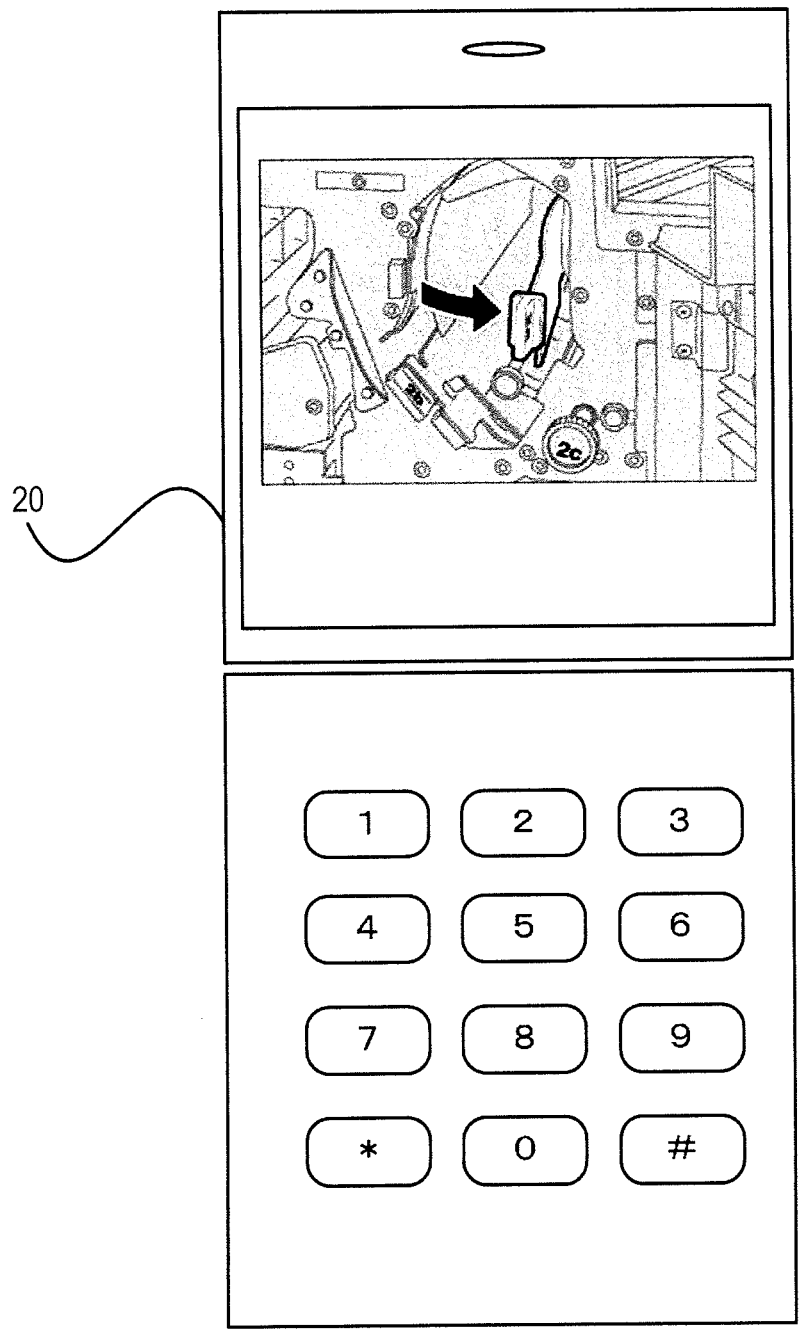
FIG. 11 is a diagram showing exemplary operation information to be displayed on the display screen of the mobile terminal device.

As shown in FIG. 11, for example, the mobile terminal device 20 displays the operation information provided by the image forming device 10 on the display device (step S409). When an image of the operation information is being divided into a plurality of image pieces, the mobile terminal device 20 repeats such a process for a required number of times.

When the image forming device 10 determines that the process needed for solving the problem is completely through (step S410), an operation information erase notification is provided by the image forming device 10 to the mobile terminal device 20 (step S411). Upon reception of the operation information erase notification, the mobile terminal device 20 accordingly erases the operation information on display from the display screen (step S412), and forwards a response to the operation information erase notification back to the image forming device 10, thereby ending the process (step S413).

FIGS. 12A to 12C show an exemplary display when the operation information control section 33 of the image forming device 10 forwards only image data for display of specific operation information to the mobile terminal device 20. Herein, the operation information is the one including any operation difficult for a user to execute if the user keeps looking at the display section 34. In this example, among the operation steps in FIGS. 12A to 12C, only the operation step in FIG. 12B is assumed as being the operation difficult for the user to execute if the user keeps looking at the display section 34.

In such a case, the operation information control section 33 of the image forming device 10 forwards only image data of the operation information about the operation step in FIG. 12B to the mobile terminal device 20, and image data of the operation information about the operation steps in FIGS. 12A and 12C is not provided to the mobile terminal device 20. On the display screen of the mobile terminal device 20, only the operation information about the operation step in FIG. 12B is displayed.

Modified Example

Exemplified in the above exemplary embodiment is the case of applying the invention to an image forming device such as facsimile device and printer. The invention is surely not restrictive thereto, and is applicable to any other types of electronic device provided with a display section for display of operation information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the skilled in the art to understand the invention for various embodiments and with the various modifications as are suited to the particular use contemplated. It is intended that the scope of the invention be defined by the following claims and their equivalents.

What is claimed is:

1. An electronic device, comprising:
    a display unit that displays an operation procedure including image data of operations of the electronic device;
    a communications unit that performs communications with a mobile terminal device;
    a determination unit that determines, for each operation, whether the operation is a first operation that is an operation including a mechanism located in a vicinity of the display unit, or a second operation that is an operation including a mechanism not located in the vicinity of the display unit; and
    a controller that, in case that the operation procedure is to be displayed on the display unit, transmits image data of operations determined to be second operations to the mobile terminal device via the communications unit, and controls the display unit to display the image data of operations determined to be first operations.

2. The electronic device according to claim 1, further comprising:
    a data division unit that divides the image data, when a capacity of a storage medium available for use in the mobile terminal device is not enough to store the image data to be transmitted by the controller, into a plurality of image data pieces,
    wherein the controller sequentially transmits, to the mobile terminal device, the plurality of image data pieces.

3. The electronic device according to claim 2,
    wherein the image data is data for displaying a plurality of images, and
    wherein the division unit divides the image data on a basis of the display data.

4. The electronic device according to claim 3, further comprising:
    a search unit that makes a search of, via the communication unit, the mobile terminal device around the electronic device.

5. The electronic device according to claim 4,
    wherein the controller transmits the image data corresponding to a predetermined image to the mobile terminal device.

6. The electronic device according to claim 3,
    wherein the controller transmits the image data corresponding to a predetermined image to the mobile terminal device.

7. The electronic device according to claim 2, further comprising:
    a search unit that makes a search of, via the communication unit, the mobile terminal device around the electronic device.

8. The electronic device according to claim 7,
    wherein the controller transmits the image data corresponding to a predetermined image to the mobile terminal device.

9. The electronic device according to claim 2,
    wherein the controller transmits the image data corresponding to a predetermined image to the mobile terminal device.

10. The electronic device according to claim 1, further comprising:
    a search unit that makes a search of, via the communication unit, the mobile terminal device around the electronic device.

11. The electronic device according to claim 10,
    wherein the controller transmits the image data corresponding to a predetermined image to the mobile terminal device.

12. The electronic device according to claim 1,
    wherein the controller transmits the image data corresponding to a predetermined image to the mobile terminal device.

13. The electronic device according to claim 1, wherein the controller transmits the image data corresponding to a predetermined image to the mobile terminal device.

14. The electronic device according to claim 1, wherein image data comprises a plurality of images of views of operations to be taken by a user in troubleshooting the electronic device.

15. The electronic device according to claim 1, wherein the image data comprises a plurality of images of views of operations to be taken by a user in operating the electronic device.

* * * * *